(12) United States Patent
Kuo

(10) Patent No.: US 7,806,234 B2
(45) Date of Patent: Oct. 5, 2010

(54) LUBRICANT DELIVERY SYSTEMS AND METHODS FOR CONTROLLING FLOW IN LUBRICANT DELIVERY SYSTEMS

(75) Inventor: Shyang-Lin Kuo, Novi, MI (US)

(73) Assignee: Toyota Motor Engineering and Manufacturing North America, Inc., Erlanger, KY (US)

( * ) Notice: Subject to any disclaimer, the term of this patent is extended or adjusted under 35 U.S.C. 154(b) by 478 days.

(21) Appl. No.: 11/801,146

(22) Filed: May 9, 2007

(65) Prior Publication Data

US 2008/0277202 A1 Nov. 13, 2008

(51) Int. Cl.
*F16N 27/00* (2006.01)
*F01M 1/04* (2006.01)

(52) U.S. Cl. .................. 184/6.12; 184/6.8; 184/6.9; 184/6.22; 184/7.4; 123/90.33; 123/90.34; 123/90.16; 123/196 M; 123/196 R

(58) Field of Classification Search ............. 184/6.12, 184/6, 6.8, 6.4, 6.5, 7.4, 9; 123/90.33, 196 R, 123/196 M, 90.16, 90.17, 90.27, 90.34
See application file for complete search history.

(56) References Cited

U.S. PATENT DOCUMENTS

| | | | |
|---|---|---|---|
| 1,497,503 A | 6/1924 | Greuter | |
| 2,674,904 A | 4/1954 | Dickson | |
| 3,628,513 A | 12/1971 | Grosseau | |
| 3,958,541 A | 5/1976 | Lachnit | |
| 4,852,534 A * | 8/1989 | Amaral | 123/196 R |
| 4,858,574 A | 8/1989 | Fukuo et al. | |
| 4,876,916 A | 10/1989 | Maier | |
| 4,896,634 A | 1/1990 | Kronich | |
| 5,027,762 A | 7/1991 | Tokuyama et al. | |
| 5,111,660 A * | 5/1992 | Gettel | 60/468 |
| 5,186,129 A | 2/1993 | Magnan et al. | |
| 5,913,293 A * | 6/1999 | Ochiai | 123/90.33 |
| 5,937,812 A | 8/1999 | Reedy et al. | |
| 5,988,129 A | 11/1999 | Prior et al. | |
| 6,227,155 B1 | 5/2001 | Tosaka et al. | |
| 6,263,844 B1 | 7/2001 | Ozeki et al. | |
| 6,631,701 B2 | 10/2003 | Seader et al. | |
| 6,729,284 B2 * | 5/2004 | Lunsford | 123/90.33 |
| 6,810,845 B1 * | 11/2004 | Plenzler et al. | 123/90.33 |
| 6,871,620 B2 | 3/2005 | Aimone | |
| 2005/0061279 A1 | 3/2005 | Plenzler et al. | |
| 2005/0199202 A1 | 9/2005 | Hoi | |

* cited by examiner

*Primary Examiner*—Robert A Siconolfi
*Assistant Examiner*—San Aung
(74) *Attorney, Agent, or Firm*—Dinsmore & Shohl LLP

(57) ABSTRACT

Embodiments are directed to lubricant delivery systems and methods. In one embodiment, the system comprises a lubricant feeder; a pipe comprising at least one nozzle; and at least one lubricant flow outlet extending upwardly from the nozzle. The nozzle comprises at least one flow area reducing portion along the length of the pipe near the lubricant feeder and the at least one lubricant flow outlet is configured to provide lubricant to at least one portion of a machine. In one embodiment, a method for controlling flow is provided comprising; delivering lubricant to an initial section of a lubricant delivery system; increasing the speed of the lubricant as it approaches a first outlet; allowing a portion of the lubricant to exit through the outlet; decreasing the speed of the lubricant after it passes the outlet; and allowing at least a portion of the lubricant to exit through a second outlet.

20 Claims, 4 Drawing Sheets

LUBRICANT DELIVERY SYSTEMS AND METHODS FOR CONTROLLING FLOW IN LUBRICANT DELIVERY SYSTEMS

TECHNICAL FIELD

The present invention is directed to lubricant delivery systems and methods for controlling flow in lubricant delivery systems.

BACKGROUND OF THE INVENTION

Current camshaft oil delivery pipe systems are typically designed based on the need to fit the pipe within the available space inside the head cover rather than the consideration of increasing the lubricating efficiency of the camshaft. As such, conventional camshaft designs incorporate a constant cross-section of round pipe with an array of outlets which carries the lubricant oil flow. The flow of the oil within the pipe is driven by the pressure from the oil feeder. As the pressure from the feeder decreases in the areas further away from the feeder, less oil is ejected from the outlets. Thus, those areas of the pipe which are further downstream from the oil feeder receive much less lubricating oil than those nearest the feeder. Currently, for the camshaft areas away from the feeder to receive proper lubrication, they are dependent upon the oil splash effect from near-by rotating cams. Without more even distribution, problems can arise such as increased thermal load, uneven oil drain distribution, frictional loss, oil windage loss, oil spill in head gaskets, limited engine performance, and/or limited durability. Thus, improved lubricant delivery systems and methods which address one or more of these issues are needed, especially those which can be used for a camshaft.

SUMMARY

One embodiment of the current invention is directed to a lubricant delivery system comprising: a lubricant feeder; a pipe operable to receive and deliver lubricant, and comprising at least one nozzle. The nozzle comprises at least one flow area reducing portion along the length of the pipe near the lubricant feeder. At least one lubricant flow outlet extends upwardly from the at least one nozzle of the pipe. The at least one lubricant flow outlet is configured to provide lubricant to at least one portion of a machine.

According to another embodiment, a lubricant delivery system is provided comprising: a lubricant feeder; a camshaft pipe operable to receive and deliver lubricant, and comprising at least one straight portion, at least one tapered nozzle, and a non-tapered nozzle. The tapered nozzle comprises at least one inwardly tapering portion and at least one outwardly tapering portion and is located along the length of the pipe near the lubricant feeder. The system further comprises a lubricant flow outlet extending upwardly from the at least one tapered nozzle and the at least one non-tapered nozzle of the camshaft pipe. The at least one lubricant flow outlet is configured to provide lubricant to at least a portion of the camshaft.

According to yet another embodiment, a method is provided for controlling flow in a lubricant delivery system comprising; delivering lubricant to an initial section of a lubricant delivery system; and increasing the speed of the lubricant as it approaches a first outlet in the system. The method further comprises allowing a portion of the lubricant to exit through the outlet to provide lubricant to a machine part; decreasing the speed of the lubricant after it passes the outlet; and allowing at least a portion of the lubricant to exit through a second outlet downstream from the first outlet to provide lubricant to a machine part.

Additional embodiments, objects and advantages of the invention will become more fully apparent in the detailed description below.

BRIEF DESCRIPTION OF THE DRAWINGS

The following detailed description will be more fully understood in view of the drawings in which.

Figure 1:
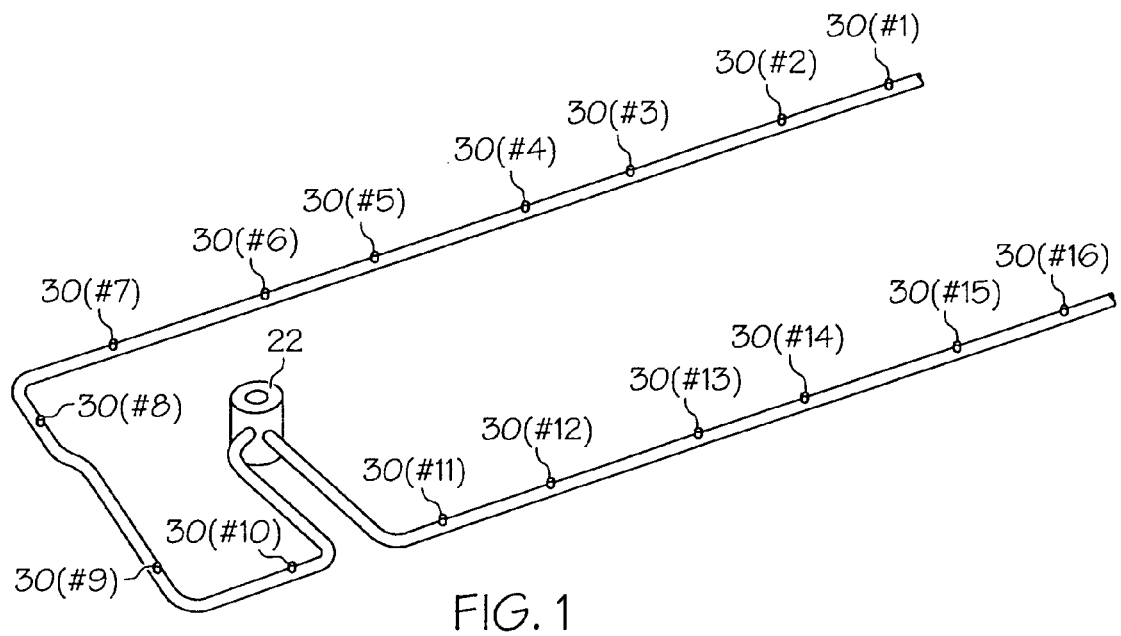
FIG. 1 is a perspective view depicting a lubricant delivery system wherein the pipe has a constant cross-section.

The embodiments set forth in the drawings are illustrative in nature and are not intended to be limiting of the inventions defined by the claims. Moreover, individual features of the drawings and the invention will be more fully apparent and understood in view of the detailed description.

DETAILED DESCRIPTION OF THE ILLUSTRATIVE EMBODIMENTS

Figure 3:
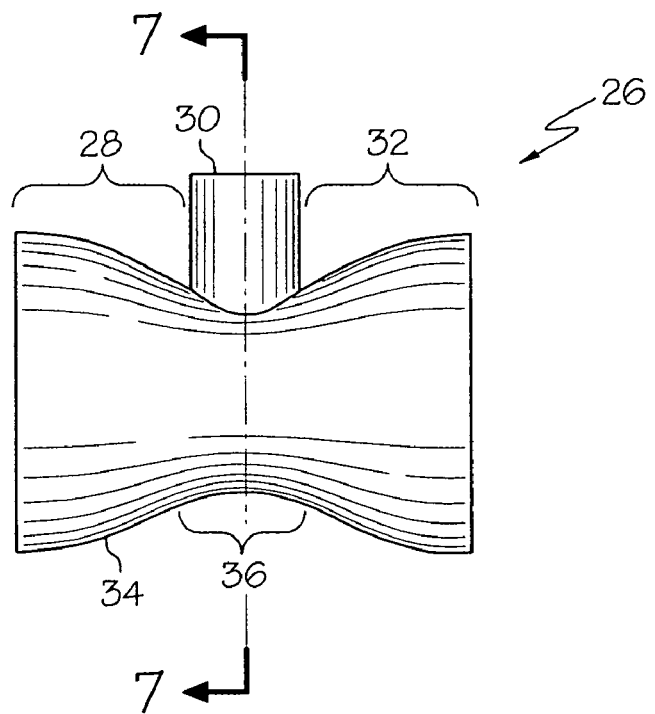
FIG. 3 is a perspective view of a nozzle according to one embodiment of the present invention.
Figure 4:
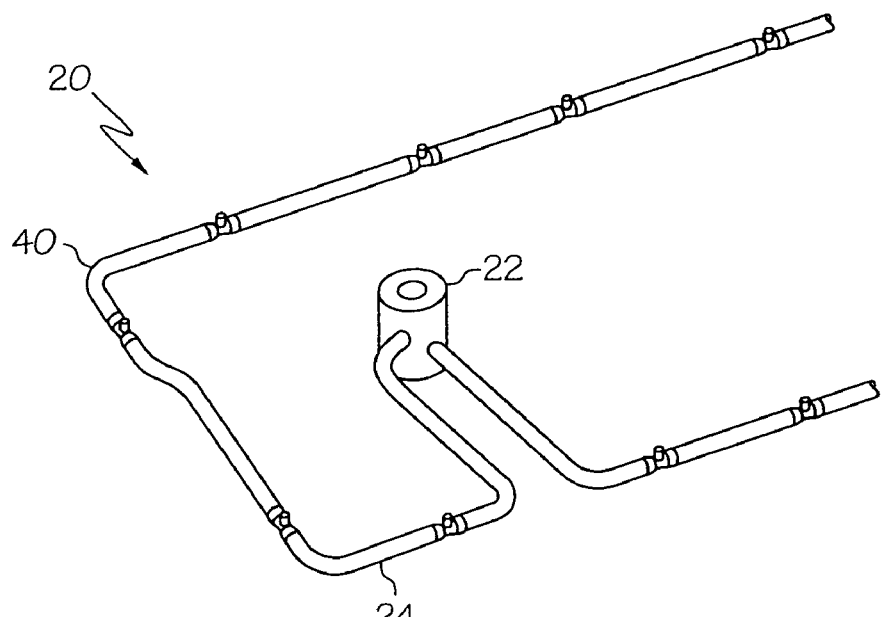
FIG. 4 is a perspective view of a lubricant delivery system according to one embodiment of the present invention.
Figure 5:
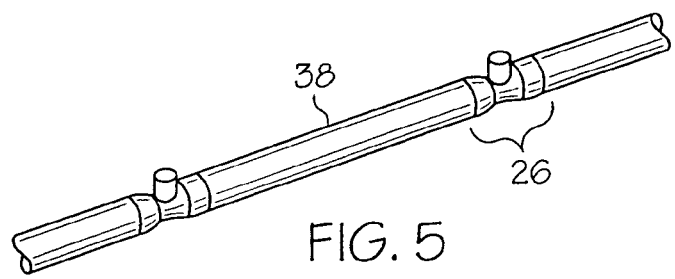
FIG. 5 is a perspective view showing a section of the illustrative delivery system in FIG. 4.

The embodiments of FIGS. 3-5 are directed to lubricant delivery systems and methods for controlling flow in lubricant delivery systems. According to one embodiment, a lubricant delivery system 20 is provided. The systems includes a lubricant feeder 22; a pipe 24 operable to receive and deliver lubricant; and at least one nozzle 26. The nozzle includes at least one flow area reducing portion 28 along the length of the pipe 24 near the lubricant feeder 22; and at least one lubricant flow outlet 30 extending upwardly from the at least one nozzle 26 of the pipe 24. The at least one lubricant flow outlet 30 is configured to provide lubricant to at least one portion of a machine.

It has been found that installing a lubricant flow outlet 30 at least partially above the at least one flow reducing portion 28 of the nozzle 26 introduces larger pressure loss before the lubricant flow reaches the outlet 30. In this configuration, the lubricant flow in the main pipe 24 moves faster through the area beneath the lubricant flow outlet 30 and thus, less lubricant exits through the outlet 30. With less lubricant exiting through the outlet or outlets 30 near the lubricant feeder 22, more lubricant remains in the pipe 24 and is capable of traveling further down the pipe 24. With more lubricant traveling further down the pipe 24, the portions of the machine furthest downstream have a greater ability to be lubricated. In addition, the reduction of the amount of lubricant exiting through the outlet(s) 30 nearest the lubricant feeder 22 prevents the corresponding areas of the machine from receiving too much lubricant. With more even delivery of lubricant to all of the portions of the machine, the thermal load and friction loss from rotating the machine (for example, a camshaft) can also be reduced in some embodiments. It should be noted that installing the nozzle 26 on the pipe 24 for more efficient lubricant delivery can be employed on any shape of pipe (circular, rectangular, triangular, hexagonal, etc.).

In this embodiment of FIGS. 3-5, the nozzle 26 further comprises a flare portion 32, wherein the flow area reducing portion 28 comprises a tapered portion 34. Further, the tapered 34 and flared 32 portions join to form a throat portion 36. Additionally, in this and other embodiments, the inner cross-sectional area of the pipe 24 is configured such that lubricant flowing through the pipe 24 increases in speed as it passes through the tapered portion 34, maintains that speed as it passes through the throat portion 36, and then decreases in speed as it passes through the flared portion 32. Other configurations to provide this effect can be utilized, such as a stepped configuration from a first diameter to a second smaller diameter to a third diameter larger than the second, for example.

In another embodiment, the pipe further comprises at least one straight portion 38 and in an additional embodiment the straight portion 38 is attached to the at least one nozzle 26 and extends toward the lubricant feeder 22. The configuration of the pipe 24 can comprise any configuration which allows for an improved delivery of lubricant to the machine. Thus, in one embodiment, there is one nozzle 26 which is located near the lubricant feeder 22. In another embodiment, there are several nozzles 26 in the delivery system 20 with one of the nozzles 26 being located near the lubricant feeder 22. The nozzles 30 will generally be separated by portions of pipe 24. These portions of pipe 24 can be straight 38, curved 40, angled, etc. In one embodiment, the pipe 24 comprises two nozzles 26, wherein the nozzles 26 are each connected to a straight portion 38.

Figure 2:
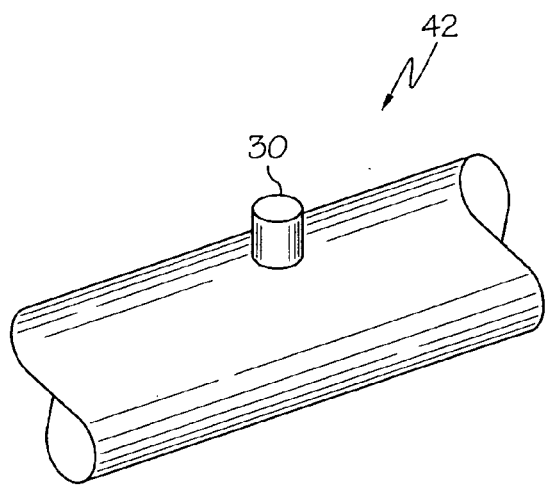
FIG. 2 is a perspective view showing one section of the pipe in FIG. 1 showing the constant cross-section.
Figure 8:
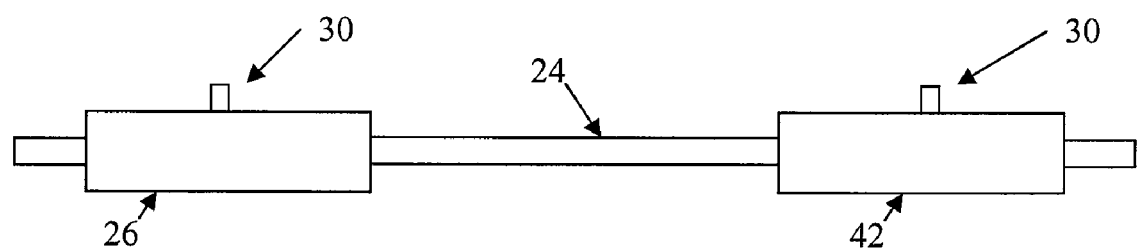
FIG. 8 illustrates diagrammatically a combination of a tapered nozzle and a non-tapered nozzle according to one embodiment.

In an additional embodiment, the pipe 24 further comprises at least one non-tapered nozzle 42 and at least one lubricant flow outlet 30 extending upwardly from the non-tapered nozzle 42, see FIGS. 1-2. Any combination of nozzles 26 and non-tapered nozzles 42 are appropriate where they allow for improved delivery of lubricant to the machine (see FIG. 8). Thus, looking to FIG. 1, any of the nozzles 1-16 could be tapered, such as the nozzle of FIG. 3. For example, in one embodiment, the at least one nozzle 26 of FIG. 3 and the at least one non-tapered nozzle 42 of FIG. 2 alternate in sequence and are separated by straight portions 38 (see FIG. 5) of the pipe 24. In another embodiment, there is a nozzle 26 located near the feeder 22 and the rest of the system comprises non-tapered nozzles 42. In another embodiment, there are two nozzles 26 located on opposite sides of the lubricant feeder 22 and the rest of the system comprises non-tapered nozzles 42. Using FIG. 1 as an example of locations of outlets, the previous embodiment would have a nozzle 26 located at positions 10 and 11 and the rest of the system would have non-tapered nozzles 42 (locations 1-9 and 12-16).

In another embodiment, (and with reference to FIGS. 1-2 and 4-5) a camshaft lubricant delivery system 20 is provided and includes a lubricant feeder 22 and a camshaft pipe 24 which is operable to receive and deliver lubricant, and includes at least one straight portion 38. The system further includes at least one tapered nozzle 26 and a non-tapered nozzle 42, wherein the tapered nozzle 26 comprises at least one inwardly tapering portion 28 and at least one outwardly tapering portion 32 and is located along the length of the pipe 24 near the lubricant feeder 22. The system also includes a lubricant flow outlet 30 extending upwardly from the at least one tapered nozzle 26 and the at least one non-tapered nozzle 42 of the camshaft pipe 24, wherein the at least one lubricant flow outlet 30 is configured to provide lubricant to at least a portion of the camshaft. Like described above, the configuration of the nozzles 26, 42 and pipe 24 can be any which allow for improved delivery of lubricant to the camshaft. For example, in one embodiment, the camshaft pipe 24 comprises two tapered nozzles 26 and the tapered nozzles 26 are located adjacent one another and are connected to a straight portion 38. In another embodiment, the at least one tapered nozzle 26 and the at least one non-tapered nozzle 42 alternate in sequence and are separated by straight portions 38.

According to yet another embodiment and with reference to FIGS. 1 and 3-5, a method for controlling flow in a lubricant delivery system is provided. The method includes delivering lubricant from the lubricant feeder 22 to an initial section of a lubricant delivery system and increasing the speed of the lubricant as it approaches an outlet 30 in the system. The increase in speed is achieved through entry into a flow reducing portion 28. The increase in speed is maintained while the lubricant travels through the throat portion 36. A portion of the lubricant is allowed to exit through the outlet 30 to provide lubricant to a machine part. The speed of the lubricant is decreased after it passes the outlet 30 as it passes into the flared portion 32. In addition, at least a portion of the lubricant is allowed to exit through a second outlet 30 downstream from the first outlet 30 to provide lubricant to a machine part. In an additional embodiment, the first outlet 30 is located adjacent to the lubricant feeder 22 (in FIG. 1, nozzles 10 and/or 11).

In one embodiment, the lubricant delivery system 20 is for a camshaft. In another embodiment, the method further comprises increasing the speed of the lubricant as it approaches the second outlet 30 downstream from the first outlet 30 and decreasing the speed of the lubricant after it passes the second outlet 30 (the increasing and decreasing of speed is achieved through the process described above. In yet another embodiment, the method further comprises increasing the speed of the lubricant as it approaches a third outlet 30, allowing a portion of the lubricant to exit through the outlet 30 to provide lubricant to a machine part, and decreasing the speed of the lubricant after it passes the third outlet 30. Thus, for example, looking at FIG. 1, the tapered nozzles 26 of FIG. 3 could be located at positions 10, 9, and 8 or 11, 12, and 13.

Figure 6:
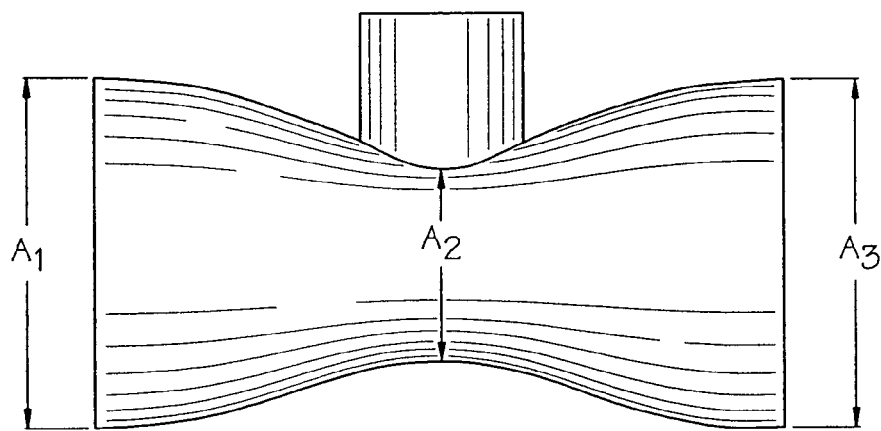
FIG. 6 is a perspective view of a nozzle according to one embodiment of the present invention.

FIG. 6 shows a side perspective of another nozzle according to one embodiment of the invention. To assess the shape-changing effect from a traditional design of constant cross-section into a converging-diverging nozzle type of cross-section of the embodiment of FIGS. 6 and 7, the amount of pressure loss can be estimated. To do so, the lubricant can be allowed to flow through three sections with cross-sectional areas of $A_1$, $A_2$, and $A_3$ and the corresponding pressure of $P_1$, $P_2$, and $P_3$ can be measured respectively. The pressure loss coefficient $C_L$ can be represented in the following formula (ignoring the pipe wall frictional loss): $C_L=(P_1-P_3)/(P_1-P_2)=(1-A_2/A_3)/(1+A_2/A_1)$.

Due to pressure loss occurring before the throat portion 36, lubricant flow starts accelerating between the flow reducing portion 28 and the throat portion 36 with maximum passing speed at the throat portion 36. Therefore, a smaller amount of the lubricant flow is ejected through the outlet 30 which sits on top of the throat area 36. Between the throat 36 and the flared portion 32, pressure (also flow potential) recovery occurs to decelerate the flow. This allows for higher amounts of ejected flow through the down stream outlets 30. By implementing this configuration to the first few outlets 30 near the lubricant feeder 32, for example, outlets of 10 and 11 of FIG. 1, less lubricant is ejected from these outlets 30 which increases the lubricant amount to the areas downstream where normally there is not enough lubricant received through the outlets 30.

Figure 7:
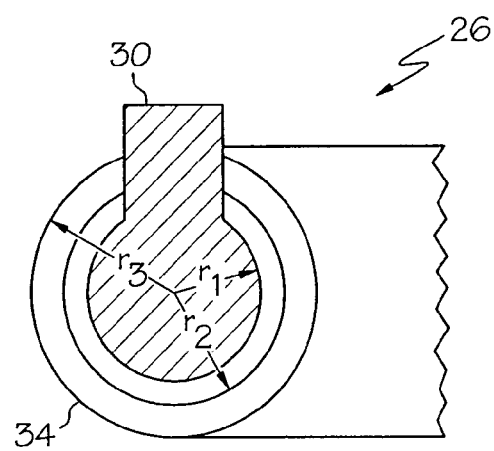
FIG. 7 is a cross-sectional view of a nozzle according to the embodiment of FIG. 3 taken along line 7-7 on FIG. 3

As shown in FIG. 7, nozzles 26 according to one embodiment can have a multitude of radii. Three possible radii are illustrated in FIG. 7 where r, represents the radius from the center of the pipe to a pipe wall at the narrowest portion of the nozzle 26. $R_2$ represents a larger radius at an intermediate portion of the nozzle 26 (this would be found in the tapered 28 and/or flared 32 portions of the nozzle 26. $R_3$ represents the widest possible radius of the pipe. This would be found before and after the tapered 28 and flared 32 portions of the pipe.

EXAMPLES

To see how the nozzle shape of the pipe changes the outlet flow, models can be are built to assess the effect and compare the result from the original constant cross-section pipe. Table 1, below, lists the dimension of nozzles for test cases. Note that for models 1 and 2, diameters entering into the nozzle area and exiting the nozzle area are the same ($D_1=D_3$), and a non-unitary ratio of diameters between the throat area and when entering the nozzle area below the outlet ($D_2/D_1$) means a nozzle shape, like that in FIG. 3 for example, is implemented at the specified outlet. FIG. 1 shows an example of a lubricant delivery system where each outlet is given a number to reflect its location in the lubricant system. Thus, according to the models listed in Table 1, outlet 1 on FIG. 1 would have a non-tapered nozzle in both models 1 and 2, while other nozzles not having a 1.0 designation would be tapered.

TABLE 1

| | Models | | |
|---|---|---|---|
| Outlets | Model Original | Model #1 | Model #2 |
| Out1 | 1.0 | 1.0 | 1.0 |
| Out2 | 1.0 | 1.0 | 0.6 |
| Out3 | 1.0 | 1.0 | 0.6 |
| Out4 | 1.0 | 1.0 | 0.6 |
| Out5 | 1.0 | 1.0 | 0.6 |
| Out6 | 1.0 | 1.0 | 0.6 |
| Out7 | 1.0 | 1.0 | 0.6 |
| Out8 | 1.0 | 1.0 | 0.6 |
| Out9 | 1.0 | 1.0 | 0.6 |
| Out10 | 1.0 | 0.7 | 0.6 |
| Out11 | 1.0 | 0.7 | 0.6 |
| Out12 | 1.0 | 1.0 | 0.6 |
| Out13 | 1.0 | 1.0 | 0.6 |
| Out14 | 1.0 | 1.0 | 0.6 |
| Out15 | 1.0 | 1.0 | 0.6 |
| Out16 | 1.0 | 1.0 | 0.6 |

Un-used SAE30 oil with an inlet pressure of 490 kpa at the lubricant feeder is used in this example to conduct fluid flow analysis. It can be seen from Tables 2 (Mass Flux Ejected at Each Outlet) and 3 (Percentage of Total Inlet Mass Ejected at Each Outlet), and FIG. 8 (Mass Flux at All Outlets at 490 kpa Inlet Pressure) that with just two outlets (in O.U. 1: Outlets 10 and 11, the first outlet from each pipe branch) implementing the nozzle, the ejected amount of oil significantly increases for those outlets near the end of the camshaft pipe (5.7% to 7.8% from Outlet 1 to Outlet 5—a 36.84% improvement in these embodiments). Also, for those outlets close to the lubricant feeder (Outlets 9-11, for example) the amount of oil ejected is reduced. The normalized mass flux for all outlets (Table 4—Normalized Mass Flux and FIG. 9—Normalized Mass Flux) show that the maximum value drops from 43.35 to 19.75—a 54.44% improvement in these embodiments. Therefore, installing nozzles at, at least some of the outlets, especially the upstream outlets, can have favorable effects of overall ejected mass flow distribution. Further improvement is observed in other embodiments by implementing nozzles at every outlet except the furthest one (as shown by model 2): 5.7%-8.38% for Outlet 1 to Outlet 5, a 47.02% improvement and the maximum normalized mass flux drops from 43.35 to 14.36, a 66.86% improvement. Since the lubricant pump normally operates between 100 kpa and 490 kpa, a separate study shows that the phenomenon of the uneven mass flow distribution is much worse in low pressure than in high pressure lubricant systems. Therefore, the percentage of oil lubricant efficiency improvement would be even higher when the engine is running at a lower speed.

TABLE 2

| Mass Flux (g/sec) | Model Original | Model #1 | Model #2 |
|---|---|---|---|
| Inlet | 20.9672 | 21.5172 | 21.2332 |
| Out1 | −0.0755 | −0.1321 | −0.1934 |
| Out2 | −0.1087 | −0.1752 | −0.1854 |
| Out3 | −0.1982 | −0.2883 | −0.3040 |
| Out4 | −0.3041 | −0.4194 | −0.4321 |
| Out5 | −0.5081 | −0.6656 | −0.6640 |
| Out6 | −0.7359 | −0.8944 | −0.8720 |
| Out7 | −1.1190 | −1.2824 | −1.2253 |
| Out8 | −1.4934 | −1.6634 | −1.5575 |
| Out9 | −2.6259 | −2.6084 | −2.4236 |
| Out10 | −3.2713 | −2.5312 | −2.7771 |
| Out11 | −2.9579 | −2.2673 | −2.5568 |
| Out12 | −2.3887 | −2.4544 | −2.2179 |
| Out13 | −1.7183 | −1.9145 | −1.7620 |
| Out14 | −1.4059 | −1.6366 | −1.5231 |
| Out15 | −1.0788 | −1.3517 | −1.2949 |
| Out16 | −0.9775 | −1.2322 | −1.2443 |

TABLE 3

| | Models | | |
|---|---|---|---|
| Outlets | Model Original | Model #1 | Model #2 |
| Out1 | 0.36% | 0.61% | 0.91% |
| Out2 | 0.52% | 0.81% | 0.87% |
| Out3 | 0.95% | 1.34% | 1.43% |
| Out4 | 1.45% | 1.95% | 2.04% |
| Out5 | 2.42% | 3.09% | 3.13% |
| Out6 | 3.51% | 4.16% | 4.11% |
| Out7 | 5.34% | 5.96% | 5.77% |
| Out8 | 7.12% | 7.73% | 7.34% |
| Out9 | 12.52% | 12.12% | 11.41% |
| Out10 | 15.60% | 11.76% | 13.08% |
| Out11 | 14.11% | 10.54% | 12.04% |
| Out12 | 11.39% | 11.41% | 10.45% |
| Out13 | 8.20% | 8.90% | 8.30% |
| Out14 | 6.71% | 7.61% | 7.17% |
| Out15 | 5.15% | 6.28% | 6.10% |
| Out16 | 4.66% | 5.73% | 5.86% |

TABLE 4

| | Models | | |
|---|---|---|---|
| Outlets | Model Original | Model #1 | Model #2 |
| Out1 | 1.00 | 1.0 | 1.0 |
| Out2 | 1.44 | 1.33 | 0.96 |
| Out3 | 2.63 | 2.18 | 1.57 |
| Out4 | 4.03 | 3.18 | 2.23 |
| Out5 | 6.73 | 5.04 | 3.43 |
| Out6 | 9.75 | 6.77 | 4.51 |
| Out7 | 14.83 | 9.71 | 6.34 |
| Out8 | 19.79 | 12.59 | 8.05 |
| Out9 | 34.80 | 19.75 | 12.53 |
| Out10 | 43.35 | 19.17 | 14.36 |
| Out11 | 39.20 | 17.17 | 13.22 |

TABLE 4-continued

| | Models | | |
|---|---|---|---|
| Outlets | Model Original | Model #1 | Model #2 |
| Out12 | 31.65 | 18.58 | 11.47 |
| Out13 | 22.77 | 14.50 | 9.11 |
| Out14 | 18.63 | 12.39 | 7.88 |
| Out15 | 14.30 | 10.23 | 6.70 |
| Out16 | 12.95 | 9.33 | 6.43 |

The foregoing description of various embodiments and principles of the invention has been presented for the purposes of illustration and description. It is not intended to be exhaustive or to limit the inventions to the precise forms disclosed. Many alternatives, modifications, and variations will be apparent to those skilled the art. Moreover, although multiple inventive aspects and principles have been presented, these need not be utilized in combination, and various combinations of inventive aspects and principles are possible in light of the various embodiments provided above. Accordingly, the above description is intended to embrace all possible alternatives, modifications, aspects, combinations, principles, and variations that have been discussed or suggested herein, as well as all others that fall within the principles, spirit and scope of the inventions as defined by the claims.

What is claimed is:

1. A lubricant delivery system comprising:
    a lubricant feeder;
    a pipe operable to receive and deliver lubricant from the lubricant feeder;
    a nozzle in communication with the pipe for receiving the lubricant therefrom, the nozzle comprising a tapered section, a flared section and a throat section between the tapered section and the flared section, wherein the tapered section has an inner diameter that decreases toward the throat section and the flared section has an inner diameter that increases from the throat section, the throat section having the smallest inner diameter of the nozzle; and
    at least one lubricant flow outlet that intersects each of the tapered section, the flared section and the throat section such that lubricant flow accelerates up to the lubricant flow outlet and decelerates upon passing the lubricant flow outlet, the at least one lubricant flow outlet extending upwardly from the at least one nozzle of the pipe, wherein the at least one lubricant flow outlet is configured to provide lubricant to at least one portion of a machine.

2. The delivery system of claim 1, wherein the pipe is a camshaft pipe.

3. The delivery system of claim 1, wherein the pipe further comprises at least one straight portion.

4. The delivery system of claim 3, wherein the at least one straight portion is attached to the at least one nozzle and extends toward the lubricant feeder.

5. The delivery system of claim 1, wherein the pipe comprises two of the nozzles.

6. The delivery system of claim 5, wherein the two nozzles are each connected to a straight portion.

7. The delivery system of claim 1, wherein the nozzle further comprises a flare portion, wherein the flow area reducing portion comprises a tapered portion, and wherein the tapered and flare portions join to form a throat portion.

8. The delivery system of claim 7, wherein an inner cross-sectional area of the pipe is configured such that lubricant flowing through the pipe increases in speed as it passes through the tapered portion, maintains that speed as it passes through the throat portion, and then decreases in speed as it passes through the flared portion.

9. The delivery system of claim 1, wherein the pipe further comprises at least one non-tapered nozzle and at least one lubricant flow outlet extending upwardly from the at least one non-tapered nozzle.

10. The delivery system of claim 3, comprising two of the nozzles, wherein the first nozzle is attached to one end of a straight portion and the second nozzle is attached to the other end of the straight portion.

11. The delivery system of claim 9, wherein the at least one nozzle and the at least one non-tapered nozzle alternate in sequence and are separated by straight portions.

12. The delivery system of claim 1, wherein the pipe further comprises a non-tapered nozzle having a lubricant flow outlet and a straight portion connecting the nozzle and the non-tapered nozzle.

13. A camshaft lubricant delivery system comprising:
    a lubricant feeder;
    a camshaft pipe operable to receive and deliver lubricant from the lubricant feeder, and comprising at least one straight portion, at least one tapered nozzle, wherein the tapered nozzle comprises a tapered section, a flared section and a throat section between the tapered section and the flared section, wherein the tapered section has an inner diameter that decreases in dimension toward the throat section and the flared section has an inner diameter that increases in dimension from the throat section, the throat section having the smallest inner diameter of the nozzle, the camshaft pipe further comprising a non-tapered nozzle;
    a first lubricant flow outlet that intersects each of the tapered section, the flared section and the throat section of the at least one tapered nozzle such that lubricant flow accelerates up to the first lubricant flow outlet and decelerates upon passing the first lubricant flow outlet, the first lubricant flow outlet extending upwardly from the at least one tapered nozzle; and
    a second lubricant flow outlet that intersects the at least one non-tapered nozzle of the camshaft pipe, wherein the at least one of the first and second lubricant flow outlets is configured to provide lubricant to at least a portion of the camshaft.

14. The delivery system of claim 13, wherein the camshaft pipe comprises two tapered nozzles and the tapered nozzles are located adjacent one another and are connected to a straight portion.

15. The delivery system of claim 13, wherein the at least one tapered nozzle and the at least one non-tapered nozzle alternate in sequence and are separated by straight portions.

16. A method for controlling flow in a lubricant delivery system comprising;
    (a) delivering lubricant to an initial section of a lubricant delivery system;
    (b) increasing the speed of the lubricant as it approaches a first outlet in the system by passing the lubricant through a tapered section of a tapered nozzle;
    (c) after step (b), allowing a portion of the lubricant to exit through the first outlet to provide lubricant to a machine part, the first outlet intersecting the tapered section of the tapered nozzle;

(d) after step (c), decreasing the speed of the lubricant not passing through the first outlet after it passes the first outlet by passing the lubricant through a flared section of the first nozzle; and (e) allowing at least a portion of the lubricant not passing through the first outlet to exit through a second outlet downstream from the first outlet to provide lubricant to a machine part.

17. The method of claim 16, wherein the first outlet is located adjacent to the lubricant feeder.

18. The method of claim 16, further comprising increasing the speed of the lubricant not passing through the first outlet as it approaches the second outlet downstream from the first outlet by passing the lubricant through a tapered section of a second tapered nozzle and decreasing the speed of the lubricant not passing through the second outlet after it passes the second outlet by passing the lubricant through a flared section of the second tapered nozzle, wherein the second outlet intersects both of the tapered section and the flared section of the second tapered nozzle.

19. The method of claim 16, further comprising increasing the speed of the lubricant as it approaches a third outlet, allowing a portion of the lubricant to exit through the outlet to provide lubricant to a machine part, and decreasing the speed of the lubricant after it passes the third outlet.

20. The method of claim 16, wherein the lubricant delivery system is for a camshaft.

* * * * *